Jan. 22, 1957 W. B. HUNN 2,778,605
ROCK DRILL
Filed June 30, 1953 6 Sheets-Sheet 2

INVENTOR
WILBUR B. HUNN
BY
ATTORNEY

Jan. 22, 1957

W. B. HUNN 2,778,605

ROCK DRILL

Filed June 30, 1953

INVENTOR.
WILBUR B. HUNN
BY
ATTORNEY

Jan. 22, 1957 W. B. HUNN 2,778,605
ROCK DRILL
Filed June 30, 1953 6 Sheets-Sheet 5

INVENTOR.
WILBUR B. HUNN
BY
ATTORNEY

INVENTOR.
WILBUR B. HUNN

United States Patent Office 2,778,605
Patented Jan. 22, 1957

2,778,605

ROCK DRILL

Wilbur B. Hunn, South Gate, Calif., assignor to Thor Power Tool Company, Aurora, Ill., a corporation of Delaware Application June 30, 1953, Serial No. 365,190

17 Claims. (Cl. 255—43)

This invention relates to a rock drill, and particularly to a drill embodying separate elements to effect rapid rotation and percussion of a drill steel. More specifically, the invention pertains to a drifter-type rock drill embodying a pneumatically operated piston hammer and a separately controlled rotary sliding vane air motor, the hammer and the rotary motor being adapted to simultaneously rotate and percuss a drill steel to provide a more effective action between the drill bit and the rock being bored.

Rock drills, for example those of a drifter type, conventionally embody means to effect both rotation and hammering of the drill steel, with the rotating means being closely associated with, and in fact operated by, the reciprocating or hammering means. Such a drill would embody a spirally fluted rifle bar adapted to effect rotation of the drill steel through a predetermined angle during each piston stroke in a given direction, and a ratchet mechanism to prevent reverse drill steel rotation as the piston returns to its initial position. It will be apparent that with such construction the rotation is necessarily relatively slow since the drill steel only rotates through a portion of a revolution during each reciprocation of the piston. Furthermore, the amount of work performed by the piston is increased, because of the necessity for rotating the drill steel, to such an extent that the frequency of the piston or hammer blows is necessarily limited.

With conventional rock drills of the type above indicated, the relatively low speeds of rotation and percussion prevent full exploitation of the advantages of carbide bits which are able to withstand, and are most effectively used with, high rotation speeds and very frequent hammer blows. In addition, the conventional rock drills are deficient in that the rotation speed is dependent upon the speed of reciprocation of the piston hammer, these elements being necessarily controlled by a single throttle valve adapted to regulate the volume of air conducted to the distributing valve for the hammer. Since rotation and hammer speeds are interdependent in conventional drills, it is impossible to achieve the type of independent control which is desirable in many situations, for example a situation in which it is wanted to increase rotation speed while maintaining hammer speed constant.

In view of the above factors characterizing the field of rock drills, it is an object of the present invention to provide a rock drilling apparatus embodying a piston hammer and a separate rotary air motor adapted to simultaneously effect rapid percussion and rotation of a drill steel, so that the full capabilities and effectiveness of carbide bits may be utilized to provide a highly effective and efficient drilling action.

Another object of the invention is to provide a rock drill in which the rotational speed of the drill steel may be varied without altering the rate of percussion, to thus provide a finer and more comprehensive control of the cutting action of the drill steel to meet the requirements of various drilling conditions.

A further object is to provide a rotary motor encompassing and slidably retaining a drilling tool, the latter being hammered through operation of a piston element while rotated by the rotary motor.

An additional object of the invention is to provide novel means for transmitting water or other cleansing fluid through the drilling apparatus and to the drill bit at substantially line pressure, means being provided to prevent fluid loss at the junction of the drill steel and the tappet or other hammering elements.

These and other objects and advantages of the invention will be more fully appreciated upon a reading of the following specification and claims considered in connection with the attached drawings to which they relate.

Figure 12:
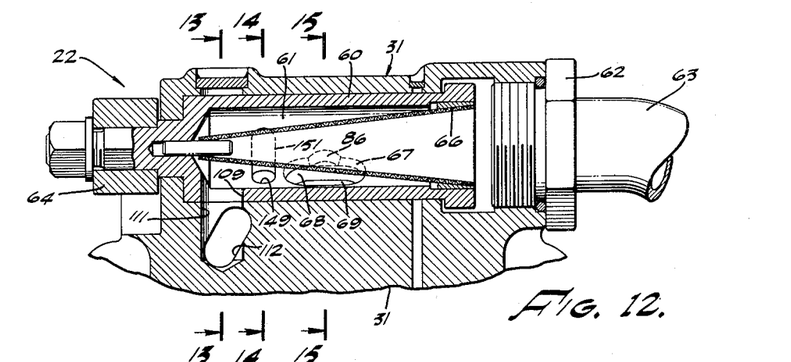
Figure 12 is a fragmentary vertical section of the drill backhead and main throttle valve, taken at line 12—12 of Figure 2.
Figure 13:
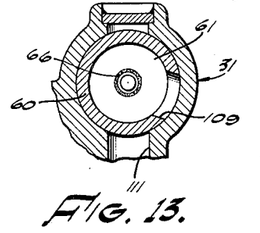
Figures 13, 13a and 13b are sections taken at line 13—13 of Figure 12 and respectively illustrating the off, part throttle and full throttle positions of the portion of the throttle valve adapted to control the air which effects roation of the rotary motor.
Figure 13A:
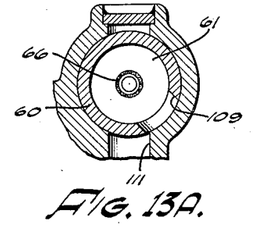
Figure 13B:
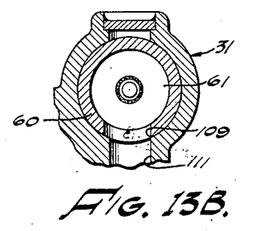
Figure 14:
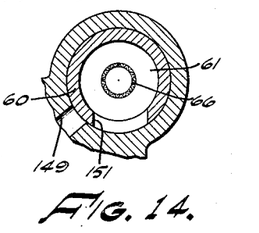
Figures 14, 14a and 14b are sections taken at line 14—14 of Figure 12 and illustrating the valve ports adapted to control the flow of air to chambers beneath the vanes of the rotary motor.
Figure 14A:
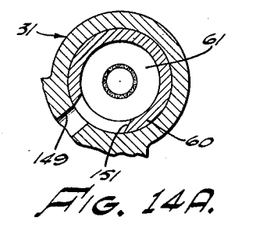
Figure 14B:
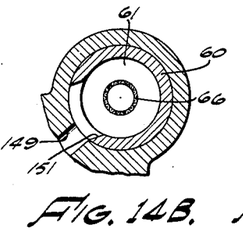
Figure 15:
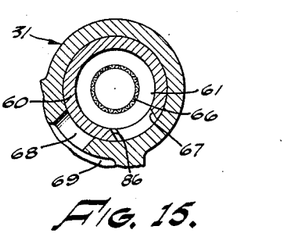
Figures 15, 15a and 15b are sections at line 15—15 of Figure 12 and showing the valve ports and passages for controlling the air flow to the distributing valve for the piston hammer.
Figure 15A:
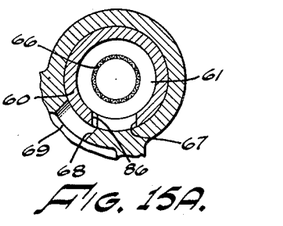
Figure 15B:
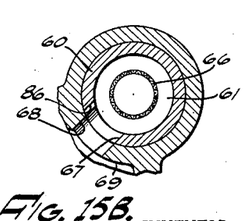

It is to be noted that Figures 14 and 15 correspond to Figure 13 in illustrating the off valve position, that Figures 14a and 15a correspond to Figure 13a in showing the part throttle position, and that Figures 14b and 15b correspond to Figure 13b to illustrate the full throttle position. It is to be further noted that both the main throttle valve, and the auxiliary valve which provides a separate control for the rotary motor, are shown in their full throttle positions in Figures 1–12.

Figures 1, 5:
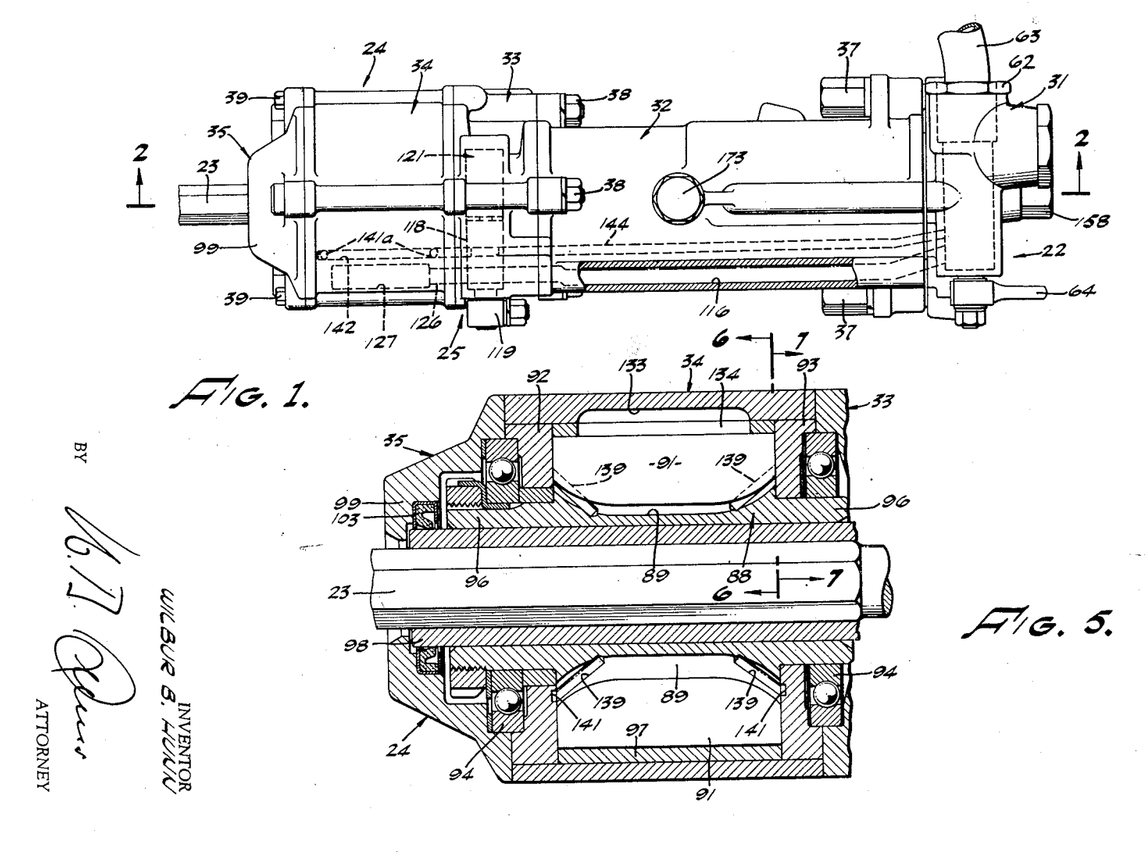
Figure 1 is a top plan view of a drilling apparatus embodying the present invention, with a portion of the drifter cylinder being broken away and sectioned to illustrate a principal air conduit.
Figure 5 is a longitudinal section taken at line 5—5 of Figure 4.
Figure 2:
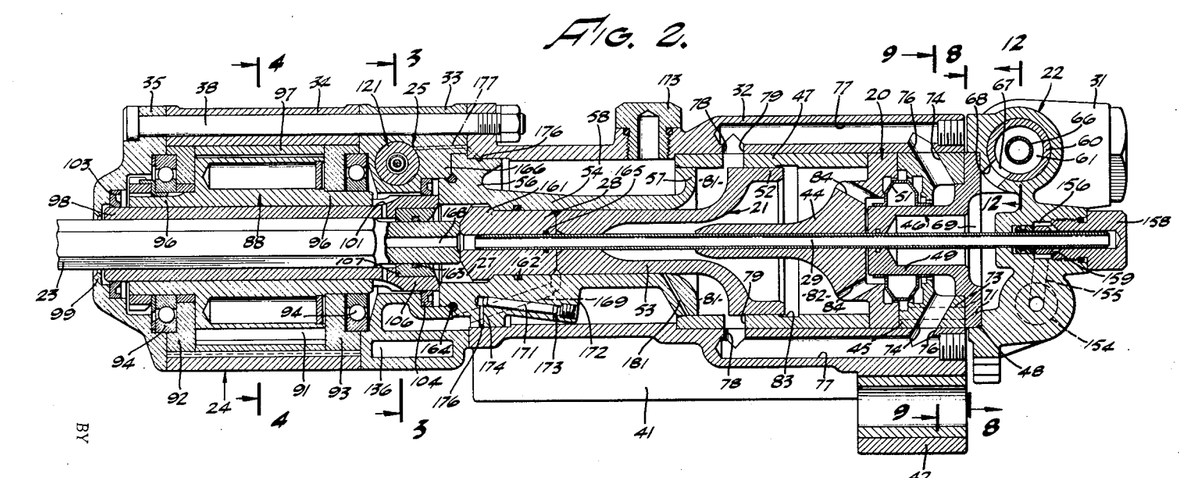
Figure 2 is a vertical longitudinal section taken along line 2—2 of Figure 1 and as viewed in the direction of the arrows.

Referring to the drawings and particularly to Figures 1 and 2, the primary operating components of the drilling apparatus comprise a distributing valve action 20 adapted to direct the flow of air to opposite sides of a piston hammer 21, there being a throttle valve 22 provided to control the air flow both to the distributing valve and to other components of the drill. The piston hammer 21 is rapidly reciprocated to impart hammer blows to a drill steel 23 having a cutting bit, not shown, at its forward end to effect a cutting or drilling action against the rock face to be bored. According to the invention, a rotary motor 24 is provided at the forward end of the drill and adapted to slidably encompass the drill steel 23 to effect its rapid rotation while permitting its forward movement under the action of piston hammer 21, the rotary motor being separately controllable by an auxiliary throttle valve 25 so that rotation speed may be varied without varying the frequency of the hammer blows. Other important components of the drilling apparatus include a sealed chamber 27 adapted to contain the abutting ends of the drill steel 23 and a tappet 28, so that water or air may pass from a tube 29 to the cutting bit without leakage and consequent decrease in pressure.

All of the above elements are contained within a generally cylindrical elongated casing which is formed of a plurality of axially disposed abutting components. Starting with the rear or back end of the drill, that is to say to the right as viewed in Figures 1 and 2, the casing components include a drill backhead 31, a main or drifter cylinder 32, a motor backhead 33, a motor cylinder 34, and a motor cylinder head 35. The drill backhead 31 is secured to drifter cylinder 32 by means of a pair of relatively large bolts 37 (Figures 3, 8 and 9) passing through diametrically opposite ears or lugs in the drifter cylinder; while the motor cylinder head 35, cylinder 34, and backhead 33 are assembled with drifter cylinder 32 by means of arcuately spaced through-bolts 38 (Figures 1, 2 and 4) and auxiliary bolts 39. In the illustrated embodiment of the invention, the main cylinder 32 is adapted with guides 41 and a feed nut 42 (Figures 2 and 4) for mounting on a conventional drifter guide shell, not shown.

Figure 10:
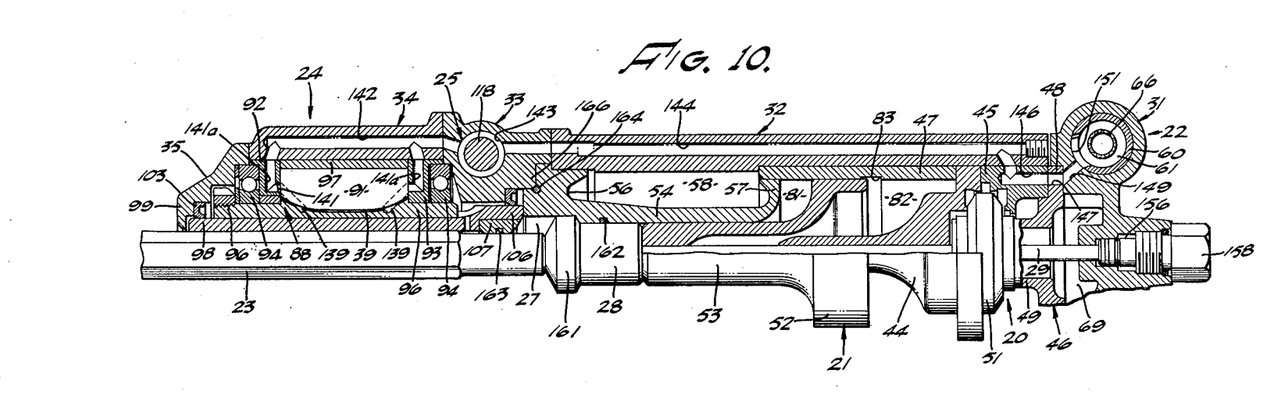
Figure 10 is a longitudinal section, of the upper portion of the drilling apparatus, taken along line 10—10 of Figure 8 and illustrating the air passage and valve means adapted to effect radially outward movement of the vanes of the rotary motor.
Figure 11:
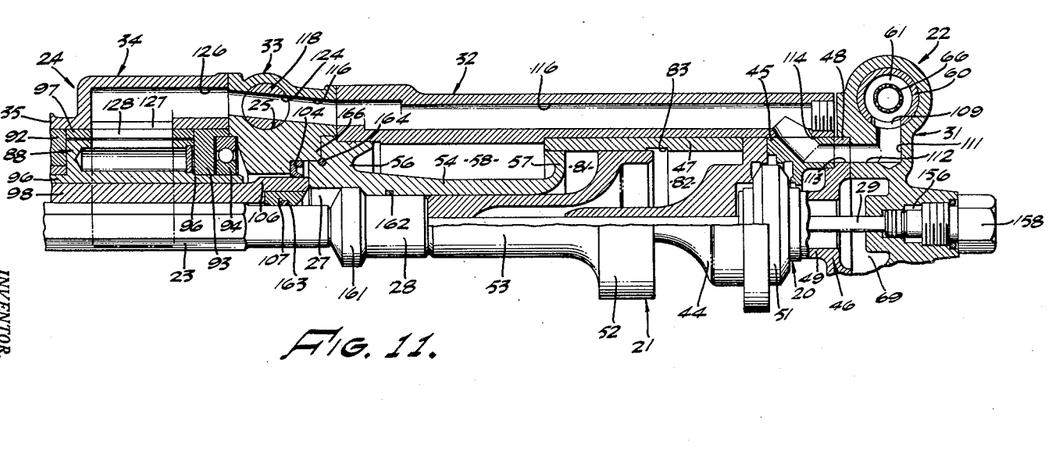
Figure 11 is a similar longitudinal section of the drilling apparatus, but taken at line 11—11 of Figure 8 to illustrate the air passage and valve means for controllably transmitting air to effect rotation of the rotary motor.

Proceeding now with the detailed description of the various operating components of the drilling apparatus, the distributing valve action 20 comprises, as shown in Figures 2, 10 and 11, a generally funnel-shaped forward valve chest 44, a generally annular rear valve chest 45, and a valve guide 46. These elements are suitably mounted between an annular seating recess in backhead 31 and the rear end of a lining sleeve 47, the latter being fixedly mounted in cylinder 32 as by seating against a shoulder therein. In addition to its flange 48 which is locked between rear valve chest 45 and the backhead 31, valve guide 46 is formed with a cylindrical center portion 49 extending axially of rear valve chest 45 to provide a slidable mounting for a valve element 51. Valve element 51 is adapted to cooperate, as will be described subsequently, with passages and ports in the adjacent drill components to alternately direct the flow of air from throttle valve 22 to opposite sides of piston hammer 21.

The piston hammer 21, which is generally funnel-shaped correspondingly to forward valve chest 44 and is recessed at its center to fit over the stem of the latter, is adapted at its rear or flanged portion 52 to sealingly slide in cylinder liner 47 either forward or backward, depending upon the position of valve 51. As the piston hammer 21 reciprocates, its cylindrical stem 53 is guided by a distance piece or spacer 54 to strike the tappet 28 and thus impart a hammer blow to drill steel 23. The distance piece 54, in which piston stem 53 reciprocates, is formed with a forward flange 56 locked in position between motor backhead 33 and drifter cylinder 32, and with a rear flange 57 disposed with its peripheral edge engaging the inner end of cylinder liner 47. The space between the forward and rear flanges 56 and 57 comprises an oil reservoir chamber 58 forming part of novel oil feed means to be described hereinafter.

Figure 8:
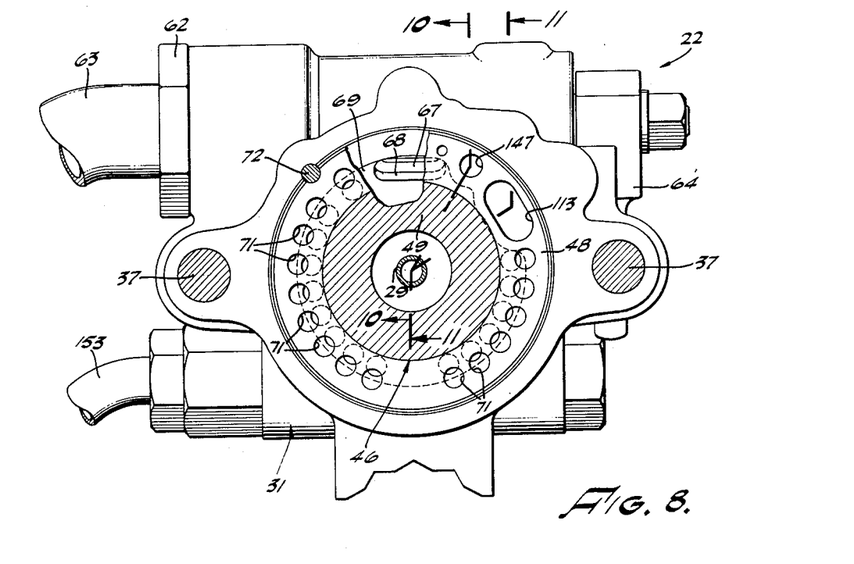
Figure 8 is a transverse section taken at line 8—8 of Figure 2 and illustrating passage and port means in both the drill backhead and the guide portion of the distributing valve action.
Figure 9:
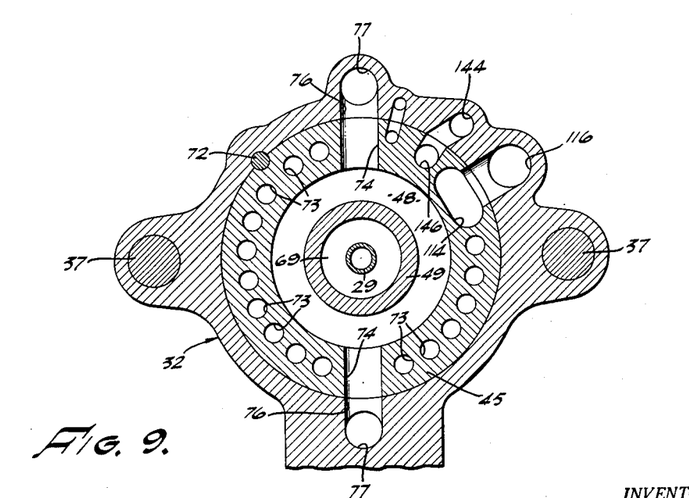
Figure 9 is a transverse section along line 9—9 of Figure 2 and illustrating the passages and ports in the drifter cylinder and in the rear valve chest.

Referring particularly to Figures 2, 8 and 12, the main throttle valve 22 comprises a tubular valve sleeve 60 which extends horizontally and transversely through a cylindrical valve chamber 61 in a rounded boss at the upper portion of drill backhead 31. Valve chamber 61 communicates through a fitting 62 with an air hose 63 leading to a suitable source of air pressure, not shown. The passage of air from the air conduit 63 and through valve chamber 61 to various air passages in the drilling apparatus may then be controlled by rotating sleeve 60 about its longitudinal axis, a handle 64 being provided for this purpose at the opposite end of the valve from the air conduit. Additional components of valve 22 include a screen 66 to filter the incoming air, and a suitable detent mechanism, not shown, adapted to effect maintenance of the valve sleeve 60 in any one of its positions except when the handle 64 is being turned by the operator.

When valve 22 is in the full throttle position, as illustrated in Figure 15b, air passes from valve chamber 61 through a port 67 in sleeve 60, through a registered port 68 in backhead 31, and into a chamber 69 defined by the backhead 31 and by the interior wall of valve guide 46. From chamber 69, the air flows through a plurality of circumferentially spaced ports 71 (Figure 8) in flange 48 of valve guide 46, the valve guide being positioned, as by the use of a key 72, so that the ports 71 register with corresponding ports 73 (Figures 2 and 9) in rear valve chest 45. Air pressure being thus transmitted to the forward surface of rear valve chest 45 at the periphery of valve 51, and the valve element 51 being in the forward position shown in Figure 2, air will flow through suitable valve chest grooves and chambers along the rear face of valve 51 and through radial ports 74 in the rear valve chest to communicating radial ports 76 in drifter cylinder 32. Ports 76 communicate with longitudinal passages 77 in the drifter cylinder and which lead forwardly to registered ports 78 and 79 provided, respectively, in the drifter cylinder and sleeve 47. The ports 79 lead to a chamber 81 defined by distance piece flange 57 and the forward surface of piston flange 52, so that the air pressure is transmitted to chamber 81 to effect rearward shifting of piston 21 from the forward position illustrated.

As piston 21 is shifted toward the rear of the drill, the air in chamber 82, which is defined by the rear or back piston surface and the corresponding forward surface of valve chest 44, is initially exhausted through an annular groove 83 in liner 47 to a suitable exhaust port, not shown. However, as soon as flange 52 of piston 21 has traveled sufficiently far to block groove 83, the air in chamber 82 will be somewhat compressed, which will operate through ports 84 in rear valve chest 44 to slide valve element 51 from its forward to its rear position. The incoming air at the periphery of valve 51 will then no longer be able to follow the previously described path but instead will travel through suitable valve chest chambers and grooves along the forward surface of valve 51 and through the ports 84 to chamber 82. The direction of piston travel will then be in a forward direction, with air in chamber 81 first exhausting through groove 83 and then, after the piston flange 52 blocks groove 83, being compressed so that it increases in pressure. Pressure at the rear face of valve 51 will then build up to shift the valve to its original or forward position. The valve 51 is thus automatically shifted to forward and rear positions to effect a very rapid reciprocation of piston hammer 21.

When it is desired to decrease the number of hammer blows imparted to drill steel 23, the main throttle valve 22 is rotated to the position illustrated in Figure 15a, at which only a shallow recess 86 at one edge of sleeve port 67 is registered with the backhead port 68. The recess 86 is then the only means of communication between chamber 61 and port 68 leading to the distributing valve, so that a greatly restricted air flow is provided and the speed of hammer action is commensurately reduced. To completely stop the hammer action, the valve 22 is rotated to the position shown in Figure 15, the port 67 and recess 86 then being completely out of registry with backhead port 68.

Figures 3, 4:
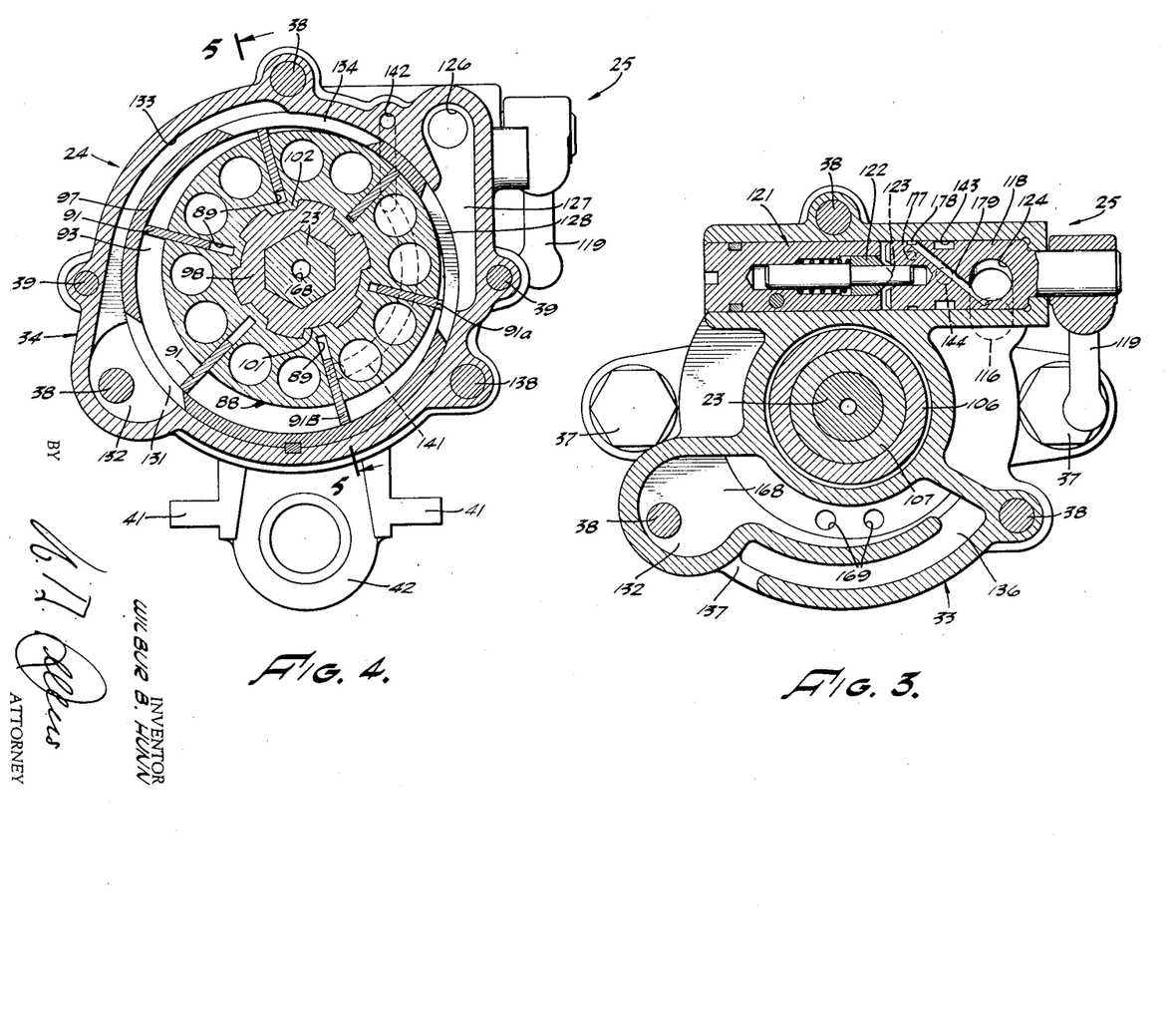
Figure 3 is a vertical transverse section along line 3—3 of Figure 2 and illustrating the backhead and control valve for the rotary motor.
Figure 4 is a transverse section along line 4—4 of Figure 2 and showing the internal components of the rotary motor.
Figure 6:
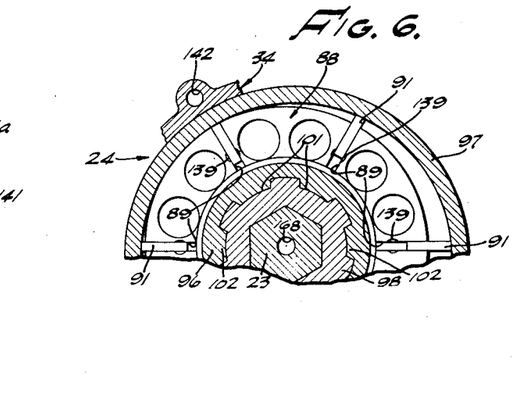
Figure 6 is a fragmentary transverse section taken at line 6—6 of Figure 5 and looking toward the forward end of the drill.

Referring to Figures 2, 4 and 5, the rotary air motor 24 is illustrated as being of the sliding vane type, and comprises a rotor 88 the relatively large diameter center portion of which is provided with arcuately spaced longitudinally extending radial grooves 89 to slidably receive vanes 91 of corresponding dimensions. The vanes 91 are held against longitudinal displacement by forward and rear center plates 92 and 93 which are mounted, inwardly adjacent ball bearing assemblies 94, respectively between the rotor center portion and the motor cylinder head 35 and backhead 33. As best illustrated in Figure 5, the center plates 92 and 93, and ball bearing assemblies 94, rotatably receive the small diameter end portions 96 of rotor 88, the relationship being such that the rotor may freely rotate to centrifugally cause vanes 91 to be thrown outwardly into rubbing engagement with a suitable cylinder liner 97. The liner 97 is generally cylindrical in shape, as shown in Figures 4 and 6, and is keyed to motor cylinder 34 eccentrically of the rotor 88 to provide air passage and chamber means for directing air against the extended vanes 91 to effect rotor rotation.

According to the present invention, the rotor 88 is adapted to rapidly rotate the drill steel 23 while permitting it to move forwardly under the action of piston hammer 21 and tappet 28. The means for accomplishing this result comprise a chuck 98 mounted axially of rotor 88 and concentrically around the drill steel 23. The chuck 98 is permitted a small amount of axial shifting, between the necked down forward end 99 of motor cylinder head 35 and the forward flange 56 of distance piece 54, but is adapted to be rotated with the rotor and to impart the rotation to drill steel 23 while permitting longitudinal shifting of the latter. For this purpose, the external surface of chuck 98 is provided with longitudinally extending straight flutes 101 (Figure 4, 6 and 7) adapted to receive correspondingly shaped ridges 102 in the rotor bore, while the center portion of the chuck is hexagonally bored to receive the drill steel 23 which is also hexagonal along this portion of its length.

In addition to serving as the means for transmitting the rotary motion of rotor 88 to drill steel 23, the chuck 98 forms part of the means for preventing leakage of air from the air motor, and for preventing leakage of the cleansing water or air from tappet chamber 27 to undesired locations. Upon reference to Figures 2 and 5, it will be seen that a resilient sealing ring 103 is seated in the central portion of cylinder head 35 and is slidably engaged with the forward end of chuck 98, and a second and corresponding sealing ring 104 is seated in motor backhead 33 to slidably engage the rear end 106 of chuck 98. It is to be noted that the flutes 101 do not extend to the chuck ends so that the latter are cylindrical and smooth for better cooperation with the sealing rings 103 and 104. In addition, the rear chuck end 106 is of relatively large diameter and is internally recessed to provide a seat for an annular bushing 107 which receives the rear end of drill steel 23, the latter being also cylindrical at this point.

In the operation of the motor and chuck components described above, the rotor 88 is air-driven, as will be described subsequently, to effect, through the flutes 101 and ridges 102, the rotation of chuck 98 and the hexagonal drill steel 23 positioned therein. The chuck and drill steel then rotate with the motor, and the rotary sealing rings 103 and 104 cooperate with the smooth cylindrical chuck ends to provide an effective air, water and oil seal.

In addition, the bushing 107 is rotated with drill steel 23 and chuck 98 and aids in preventing leakage of fluid from chamber 27 as the drill steel is hammered by piston hammer 21 acting through tappet 28.

Referring particularly to Figures 11, 12 and 13b, the air conduit and valve means for conducting air from air hose 63 to impinge against the vanes 91 of motor 24 will now be described. The air from inlet hose 63 passes into valve chamber 61 and, when the valve was in the full throttle position shown in Figures 12 and 13b, flows through a port 109 in sleeve 60 and a vertical passage 111 in drill backhead 31 into a longitudinal air passage 112 in the backhead. From passage 112, the air flows through the registered port 113 (Figure 8) in flange 48 of valve guide 46, thence through a passage 114 (Figure 9) in rear valve chest 45 and radially outwardly into a passage 116. The passage 116 extends (Figures 1 and 11) longitudinally of the drifter cylinder 32 and of the motor backhead 33, but passes through the auxiliary throttle valve 25 so that the latter may control the air flow to motor 24.

As illustrated in Figure 3, the auxiliary throttle valve 25 comprises a relatively solid cylinder 118 which is rotatably mounted transversely of the drill in a bored boss in the upper portion of motor backhead 33. The cylinder 118 may be rotated by means of a handle 119 on a projecting stem of the cylinder, there being a suitable detent arrangement 121 to insure maintenance of the cylinder in the desired position until the handle 119 is shifted by the operator. More specifically, the detent 121 comprises a spring pressed plunger 122 the inner portion of which is formed as a ridge 123 adapted to be inserted into any one of a number of diametrically disposed grooves, not shown, in the inner end of a valve cylinder 118.

When the auxiliary valve 25 is in the fully open position shown in Figure 11, the air flow in passage 116 is unimpeded since a transverse bore 124 in valve cylinder 118 is at this time fully registered with both of the components of passage 116. Air may then flow to passage 126 (Figures 4 and 11) in motor cylinder 34, thence into a chamber 127 formed in the motor cylinder and registering with an inlet port 128 in cylinder liner 97.

Referring to Figure 4, inlet port 128 is disposed in a portion of the eccentrically mounted cylinder liner 97 which is downwardly adjacent the point of tangency between the rotor 88 and the liner, so that the incoming air is directed against the outer portions of vanes 91a and 91b which are at this time slightly extended out of their respective grooves 89. Rotor 88 is thus given a clockwise movement, as viewed in Figure 4, and the incoming air travels clockwise to a primary exhaust port 131 in cylinder liner 97 and into a communicating exhaust chamber 132 in the cylinder. Exhaust chamber 132 also communicates, through a relatively flat passage 133 formed between the cylinder 34 and its liner 97, with a secondary exhaust port 134 provided in the liner upwardly adjacent the point of tangency between the rotor and liner. Exhaust chamber 132 thus receives primary and secondary exhaust air, which then passes from the chamber and through a hairpin-shaped exhaust passage 136 (Figure 3) in motor backhead 33 to an exhaust port 137 leading to the atmosphere.

When the main throttle valve 22 and the auxiliary throttle valve 25 are in the fully open positions illustrated in Figures 11 and 13b, full air pressure is admitted to the rotary motor 24 to effect its full speed operation and consequent rapid rotation of the drill steel. At this time, the piston hammer 21 is also reciprocating at full speed since, as previously described and as shown in Figure 15b, the port 67 is fully registered with port 68 leading to distributing valve 20. Should it be desired to completely stop rotation of drill steel 23 while continuing the full speed action of piston hammer 21, for example when the drill steel is caught in a seam, it is merely necessary to rotate auxiliary valve 22 to a closed position at which its bore 124 no longer registers with passage 116, the flow of air to rotary motor 24 then being effectively blocked. Should the drilling conditions make necessary the mere lowering of the speed of drill steel rotation while continuing full hammer speed, the auxiliary valve 25 is rotated until its bore 24 is only partially registered with passage 116, a reduced amount of air then being transmitted to the rotary motor to effect a lessening of its speed without complete stoppage of rotation. To reduce the speed of both percussion and rotation, the main throttle valve 22 may be turned in a position shown in Figures 13a and 15a, at which a restricted air flow is transmitted both to the distributing valve 20 and to rotary motor 24. When valve 22 is in a 13a—15a position, the auxiliary valve 25 may be turned to either fully open, fully closed, or an intermediate position to effect an additional and fine control of the drill steel rotation speed without altering the speed of the piston action.

It may thus be seen that a wide variety of rotation speeds may be achieved, with or without altering the speed of the hammer action, merely by rotating auxiliary valve 25 to its various positions and by rotating main throttle valve 22 between the fully closed position shown in Figures 13, 14 and 15, and the fully open position shown in Figures 13b, 14b and 15b. It is not only possible to reduce the rotation speed while maintaining the hammer action constant, but it is also possible to increase the rotation speed while decreasing the frequency of the hammer blows. This may be accomplished by rotating auxiliary valve 25 from a selected intermediate position to a fully open position while the main valve 22 is rotated from fully open to, for example, an intermediate position such as the one shown in Figures 13a and 15a.

When the rotary motor 24 is operating to rotate drill steel 23, motor vanes 91 are centrifugally thrown outwardly so that they rub against cylinder liner 97 to provide a maximum obstruction to the incoming air stream and consequent maximum torque or rotational force. However, it is possible that while the motor 34 is stopped, either through operation of valve 25 or valve 22, the vanes 91 may draw back to the bottoms of their respective grooves 89 and that air subsequently admitted will merely pass over the outer edges of the vanes and will not impart a rotational force to the rotor. In order to prevent any possibility of such an occurrence, the invention provides means for air-actuating the vanes 91 to their outermost radial positions, either simultaneously with or prior to the admission of the air adapted to effect rotor rotation.

Figure 7:
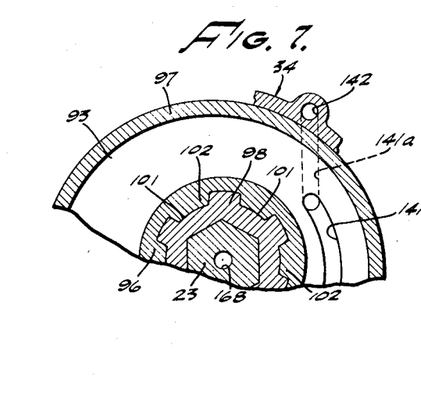
Figure 7 is a fragmentary transverse section at line 7—7 of Figure 5, and looking toward the back of the drill.

It will be seen, upon reference to Figures 5, 6 and 10, that the walls of the vane grooves 89 are provided at their ends with shallow grooves 139 which extend axially and inwardly from intermediate radial positions to the bottoms of the grooves. Grooves 139 in those of the vane grooves 89 which are downwardly adjacent inlet port 128 (Figure 4) register with arcuate grooves 141 formed in the inner surfaces of center plates 92 and 93 as illustrated in Figures 4, 7 and 10. Grooves 141, in turn, communicate through radially extending passages 141a in the center plates to a passage 142 which extends longitudinally of motor cylinder 34 and motor backhead 33 to the bore for auxiliary valve 25. Referring to Figures 3 and 10, passage 142 communicates through an annular groove 143 in valve cylinder 118 with a corresponding passage 144 extending through backhead 33 and drifter cylinder 32 (Figures 1 and 10) for communication with a passage 146 (Figure 9) in rear valve chest 45. Passage 146 is registered with a port 147 (Figure 8) in the flange 48 of valve guide 46, the port 147 being in turn registered with a passage 149 leading through drill backhead 31 to the main throttle valve 22. When the main throttle valve is in either the fully open or partly open positions illustrated in Figures 14b and 14a, the backhead passage 149 is fully registered with a relatively large port 151 in valve sleeve 60. It follows that full line pressure is transmitted through the described passages and ports to the bottoms of vane grooves 89 for outward shifting of the associated vanes 91. It is thus assured that the vanes 91 downwardly adjacent inlet port 128 (Figure 4) will be in the desired outer positions at all times except when the main throttle valve 22 is in the fully closed position as shown in Figure 14, that is to say the position in which air flow to all the drill components is blocked. It is to be noted that although the air passage to the bottoms of vane grooves 89 passes through the auxiliary valve 25, the latter valve does not operate to control this operation since the annular groove 143 in cylinder 118 registers with passages 142 and 144 in all valve positions.

Continuing now with the description of the novel means, including the sealed tappet chamber 27, for transmitting water or air at line pressure to the cutting bit, the cleansing fluid, hereinafter referred to as water, is admitted to the drill backhead through the inlet hose 153 shown in Figure 8. From hose 53, the water flows to a water valve, indicated generally at 154 in Figure 2, and then through a passage 155 in backhead 31 to a chamber 156 for water tube plug 158. In continuing its flow to the drill bit, the incoming water passes through ports 159 in the water tube plug and to the end of the water tube 29 which is sealingly inserted in the plug as shown in Figure 2. The water tube 29 extends forwardly from plug 158 through axial passages and ports in the distributing valve guide 46, the forward valve chest 44, piston hammer 21, and tappet 28, so that the water may flow through the tube 29 to the sealed chamber 27 in which the relatively large forward end or flange 161 of tappet 28 is disposed. In conventional structures, the water delivered to the chamber containing the flanged tappet end 161 leaks through various components of the drill to result not only in a reduction in the pressure of the fluid delivered to the drill bit, but also in a washing away of the lubricating fluid for the movable drill components. To prevent these highly undesirable results, the present invention provides sealing means for preventing leakage from the chamber 27 while permitting axial shifting of both the tappet 28 and drill steel 23.

Referring to Figures 2, 10 and 11, these means preferably comprise an O-ring 162 mounted in an annular groove in distance piece 54 and resiliently engaging the cylindrical shank of tappet 28, a second O-ring 163 similarly mounted in bushing 107 and engaging the cylindrical rear end of drill steel 23, and a third O-ring 164 mounted in flange 56 of distance piece 54 for engagement with a suitably shaped edge 166 formed in motor backhead 33. In addition, a fourth O-ring 165 is provided between the forward end of water tube 29 and the wall of the bore in tappet 28, this O-ring being adapted to prevent leakage of fluid from chamber 27 and into the chamber for piston hammer 21. The O-rings 162—165, and additionally the sealing ring 104 previously described, cooperate to prevent any fluid leakage from chamber 27. Cleansing water or air is thus caused to be transmitted through an axial passage 168 in drill steel 23 to the drill bit, and at substantially line pressure for maximum cleansing action.

As the piston hammer 21 reciprocates to strike tappet 28 and effect longitudinal shifting of drill steel 23 within the limits of travel of flanged tappet end 161 in chamber 27, a considerable amount of air is compressed in the distance piece bore by the stem 53 of the piston. Because of the effective sealing means provided by the present invention, the air compressed adjacent the rear end of tappet 28 would create a detrimental effect, reducing the piston efficiency, if not suitably vented. Accordingly, vent means are provided in the form of passages 169 (Figures 2 and 3) leading from adjacent the rear end of tappet 28 to the exhaust passage 136, the latter venting to the atmosphere as shown in Figure 3.

Referring to Figure 2, the means for automatically oiling the various components of the drilling apparatus include a metering pin 171 provided in a boss portion 172 at the forward end of distance piece 54. The chamber for metering pin 171 communicates through a port 173 with the oil reservoir chamber 58, the latter being refillable through a plug 173 shown in Figures 1 and 2. With the described arrangement, a metered flow of oil pours from chamber 58 and around the metering pin 171 to the forward end of the latter, thence through a passage 174 to an annular groove 176 in flange 56. Groove 176, in turn, communicates, through a passage 177 in the drifter cylinder and motor backhead, with the bore for auxiliary throttle valve 25. As shown in Figure 3, the passage 177 registers with an annular groove 178 and to a transversely extending passage 179 leading through cylinder 118 to the valve bore 124. In this manner, a metered amount of oil is transmitted from reservoir 58 to the air which flows through passages 116 (Figure 11) to effect operation of the rotary motor 24. The lubrication thus imparted to the rotary motor is, as previously described, not impaired by the presence of water since the means for sealing the water chamber 27 prevent any mixture of water and oil. In addition to the metering means for conducting oil to the rotary motor 24, other oil passages, such as passage 181 shown in Figure 2, may be provided to conduct oil from reservoir 58 to moving elements such as the stem 53 of piston hammer 21.

To summarize the operation of the major components of the drilling apparatus, let it be assumed that the auxiliary throttle valve 25 is in the fully open position shown in Figure 11, and that the main throttle valve 22 is in the fully closed position shown in Figures 13, 14 and 15, the flow of air to all of the drill components then being blocked. Let it be further assumed that the valve 154 for the water or other cleansing fluid, and which may be either of the manually or automatically operated variety, is also closed so that the path of cleansing fluid to the drill bit is blocked. In an illustrative sequence of operations, the main throttle valve 22 will then be rotated to the part throttle position shown in Figures 13a, 14a and 15a, in order to collar or center the drill bit preparatory to the full speed drilling operation. The registered recess 86 and port 69, shown in Figure 15a, then serve to permit a limited air flow through the passages shown in Figure 2 and to the distributing valve action 20, so that piston hammer 21 is reciprocated at a relatively slow rate to percuss the tappet 28 and thus drill steel 23. Although the amount of air transmitted to the piston hammer is thus limited, a full supply of air is transmitted through port 51 and passage 149 (Figure 14a), and through the various ports and passages shown in Figure 10, to the grooves 141 (Figure 4) leading to the bottoms of those vane grooves 89 which are downwardly adjacent inlet port 128. The vanes 91a and 91b (Figure 4) in advance of port 128 are thus air actuated radially outwardly into engagement with cylinder liner 97 to condition the motor for rotation.

The rotary motor 24 being conditioned to insure its rotation as desired, a restricted flow of air is admitted through port 109 and passage 111 (Figure 13a) and through the air passage means shown in Figure 11 to the open auxiliary throttle valve 25 and thence to air motor 24. The motor then rotates at a relatively low speed and effects, through chuck 98, a corresponding rotation of the drill steel 23, the latter also being hammered by piston hammer 21 acting through tappet 28. It is to be noted that the auxiliary throttle valve 25 may at this time be rotated to further restrict the amount of air transmitted to motor 24 for the purpose of rotating the same, so that the rate of motor rotation may be made as low as desired. The turning of valve 25, however, does not decrease the amount of air transmitted to the bottoms of the vane grooves, the vanes being pressure held in their outer positions at all times except when the main throttle valve is off.

After a collar hole is formed in the rock face, the main throttle valve 22 may be rotated to the full speed position shown in Figures 13b, 14b and 15b at which time a full air flow is provided to both the hammer action and to the rotary motor, assuming that the auxiliary throttle valve 25 is fully open at this time. During full speed drill operation, the water valve 154 (Figure 2) is fully open to permit flow of water through the water tube 29 to the sealed chamber 27. From chamber 27, water flows through the bore 168 in drill steel 23 and to the cutting bit in order to wash away the dirt and muck inherent in the drilling operation. The water delivered to the cutting bit is, because of the O-rings 162—165 and the sealing ring 104, at full line pressure since there is no leakage of water at the junction between tappet 28 and drill steel 23.

If, for any reason, it is desired to reduce or stop rotation of drill steel 23, it is merely necessary to turn auxiliary valve 25 to the off position blocking the flow of air to the rotary motor. In addition, numerous combinations of the positions of the valves 25 and 22 may be effected to provide an accurate and fine control of the speed of drill rotation independently of the hammer action.

The drilling apparatus of the invention is particularly advantageous when used with drill steels having carbide bits. This is because of the high rate of drill steel rotation effected by motor 24, and the frequent hammer blows which piston hammer 21 may deliver since it performs no work in rotating the drill steel, provide an extremely effective drilling action utilizing to the utmost the qualities of carbide bits.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A pneumatically operated rock drilling apparatus, comprising a generally cylindrical casing, a rotor journaled in the forward drill supporting end of said casing, said rotor having sliding vanes adapted to be radially displaced into rubbing engagement with an eccentrically disposed portion of said casing, a drill steel mounted axially within said rotor and projecting from the forward end of said casing for engagement with the rock face to be bored, means to drivingly connect said rotor and drill steel to effect rotation of said drill steel with said rotor while permitting shifting of said drill steel axially of said rotor, a piston hammer mounted in the rear end of said casing on the opposite side of said rotor from said projecting drill steel and reciprocable toward and away from the shank end of said drill steel to effect rapid percussion of the latter, a distributing valve associated with said piston hammer, air conduit means adapted to conduct air from a source of air supply to said distributing valve and to said rotor, a first throttle valve mounted in the backhead of said casing and adapted to control the flow of air through said conduit means to both said distributing valve and said rotor, and a second throttle valve mounted in said casing adjacent said rotor, said second throttle valve being in series with said first throttle valve to provide an additional control of the air supply through said conduit means to said rotor only.

2. In a pneumatic rock drilling apparatus, a casing, a rotary motor mounted in said casing, said motor having a rotor provided with grooves to receive radially slidable vanes, a drill steel having one end extending axially into said rotor for rotation therewith, said drill steel projecting from said casing and being movable axially of said rotor for cutting engagement with a rock face to be bored, piston hammer means mounted in said casing on the opposite side of said rotor from said projecting drill operable to percussively shift said drill steel axially of said rotor during rotation thereof, first air passage means to conduct air to the bottoms of said rotor grooves to shift said vanes to their outer operative positions, second air passage means to conduct air into actuating contact with said vanes to effect rotation of said rotor and drill steel, third air passage means to conduct air to said piston hammer means to effect percussion of said drill steel, a main throttle valve adapted to control the flow of air through said first, second and third passage means, and an auxiliary throttle valve adapted to control the flow of air through said second passage means only.

3. In a rock drilling apparatus, a casing, a drill steel mounted in said casing and projecting from the forward end thereof for engagement with a rock face to be bored, said drill steel having a longitudinal passage therein for transmission of cleansing fluid from the shank end of said drill steel to the bit end thereof, a fluid tube mounted in said casing and leading to adjacent said shank end of said drill steel for transmission of cleansing fluid to said passage, and means to seal the region surrounding adjacent portions of said casing, said drill steel and said fluid tube, said sealing means effecting transmission of cleansing fluid to the bit end of said drill steel at substantially line pressure.

4. In a rock drilling apparatus, a casing, a drill steel mounted in said casing and projecting from the forward end thereof for engagement with a rock face to be bored, said drill steel having a longitudinal passage therein for transmission of cleansing fluid from the shank end of said drill steel to the bit end thereof, means to define a chamber adjacent said shank end of said drill steel, a tappet mounted in said chamber, piston hammer means to percussively actuate said tappet and thus said drill steel, a water tube extending through bores in said piston hammer means and tappet and adapted to deliver water to said chamber, and sealing means to prevent leakage of water from said chamber to thereby insure delivery of water to said drill steel passage at substantially line pressure.

5. The invention as claimed in claim 4, wherein said sealing means include a first sealing ring mounted between said water tube and the wall of the bore in said tappet, and a second sealing ring mounted between the outer wall of said tappet and said chamber-defining means; and a secondary exhaust port is provided in said chamber-defining means to prevent the creation of undesired pressure by said piston hammer means as a result of the presence of said first and second sealing rings.

6. In a rock drilling apparatus, an elongated casing, a rotary air motor mounted in the forward portion of said casing, a drill steel mounted axially within the rotor of said motor and projecting from the forward end of said casing, the operative connection between said rotor and said drill steel being such that said drill steel rotates with said rotor and is slidable therethrough, a piston hammer mounted in the rear portion of said casing and reciprocable toward and away from the shank end of said drill steel to transmit hammer blows thereto, a fluid tube extending forwardly through said piston hammer and terminating adjacent said shank end of said drill steel, said fluid tube being adapted to transmit cleansing fluid to a longitudinal passage in said drill steel, and means to define a fluid-tight chamber encompassing the adjacent portions of said drill steel and fluid tube, said arrangement operating to effect delivery of cleansing fluid to the bit end of said drill steel at substantially line pressure.

7. A rock drilling apparatus, comprising an elongated casing, a rotary sliding vane air motor mounted in the forward portion of said casing, said motor having a rotor journaled in said casing and provided with an opening, a chuck mounted in said opening and adapted to rotate with said rotor, said chuck being shaped with a cylindrical end disposed rearwardly of said rotor, a bushing mounted in said rear chuck end, a drill steel mounted axially of said chuck and bushing and adapted to rotate therewith and move axially thereof, a tappet mounted in said casing adjacent the cylindrical rear end of said drill steel, said tappet being shaped with a cylindrical rear portion and with a forward flange disposed in a tappet chamber in said casing, a piston mounted in the rear portion of said casing and reciprocable to impart hammer blows to said tappet and thus to said drill steel, a water tube mounted axially of said piston and tappet and adapted to conduct water to said tappet chamber and thus to a longitudinal passage in said drill steel, and means to seal said tappet chamber against leakage of water to thereby insure transmission of water to the bit end of said drill steel at line pressure.

8. The invention as claimed in claim 7, wherein said sealing means comprise an O-ring mounted between the rear end of said drill steel and the interior wall of said bushing, and an O-ring mounted between said casing and the rear end of said tappet.

9. The invention as claimed in claim 8, wherein said sealing means additionally comprise a seal mounted between said casing and the rear end of said chuck, and an O-ring mounted between said water tube and the interior wall of said tappet.

10. In a pneumatic rock drilling apparatus, a casing, a rotary motor mounted at the forward drill-supporting end of said casing, said motor having a rotor provided with radially slidable vanes, drill chuck means mounted axially of said rotor, a drill steel for cutting engagement with a rock face to be bored having a shank end mounted in said chuck means and axially movable with respect thereto, piston hammer means mounted in said casing rearwardly of said motor and operable to percussively shift said drill steel axially of said rotor as the rotor rotates, a first air passage means to conduct air to the inner edges of said vanes to shift the same to their outer operative positions, second air passage means to conduct air into driving contact with said vanes to effect rotation of said rotor and drill steel, third air passage means to conduct air to said piston hammer means to effect percussion of said drill steel, and independently operable valve means in each of said second and third passages to control the flow of air therethrough whereby said piston hammer can be operated to deliver percussive blows to said drill steel and said drill can be rotated or held stationary at the user's option.

11. In a rock drilling apparatus, an elongated casing, a rotary motor supported at the forward end thereof, said motor having a rotor provided with an open-ended drill chuck extending axially thereof adapted to seat the shank of a hollow drill steel therein with said shank extending beyond the inner end of said chuck, a piston hammer reciprocably supported in said casing, a tappet reciprocably supported between the adjacent ends of said drill shank and of said piston hammer, a flushing fluid tube extending axially of said piston hammer and tappet for supplying a flushing fluid to said drill steel, fluid sealing means between said drill shank and chuck, sealing means between the inner end of said chuck and said casing, means for supplying a flushing fluid to said tube, means for supplying pressurized air to said casing to reciprocate said piston hammer and effect the percussive actuation of said tappet and drill steel, and means to rotate said motor rotor to rotate said drill steel.

12. A rock drilling apparatus as defined in claim 11 including separate control means for said motor and for said piston hammer whereby the speed of rotation of said drill steel may be controlled independently of the axially acting percussive speed thereof.

13. A rock drilling apparatus comprising a cylindrical chamber, a header closing the rear end of said chamber having separate air and liquid passage means therein, a valve controlling air flow through said air passage means, a separate valve controlling flow in said liquid passage means, a motor casing closing the forward end of said casing and removably secured thereacross with its axis extending lengthwise of said cylindrical chamber, a rotor in said motor casing having an open ended drill chuck extending axially therethrough, a hollow drill steel having a shank end extending through said chuck and projecting beyond the inner end thereof, means for percussively driving said drill steel including a piston hammer reciprocally supported in said chamber, means for supplying liquid from the fluid passage means in said header to said drill steel by way of said piston hammer, means for supplying pressurized air to the opposite sides of said piston hammer from said valve controlled air passage means in said header, and means for driving said drill rotating motor independently of the percussive speed of said drill.

14. A rock drilling apparatus as defined in claim 13 including means supported within said cylindrical chamber adjacent said motor and cooperating with the inner end of said chuck to form a tappet chamber, a tappet reciprocably supported in said tappet chamber having its ends juxtaposed to the adjacent ends of said drill shank and of said piston hammer respectively, said tappet having a passage therethrough for conducting flushing liquid from said piston hammer to said drill shank.

15. A rock drilling apparatus as defined in claim 14 including a plurality of fluid sealing means providing seals separating said tappet chamber both from the chamber enclosing said piston hammer and from the interior of said drill rotating motor.

16. In a rock drilling apparatus, an elongated casing, a rotary drill steel driving motor mounted on the forward end of said casing coaxially thereof, said motor having an open ended chuck extending axially therethrough for receiving the shank end of a hollow drill steel, a non-rotating piston hammer reciprocably supported in said casing adapted to drive said drill steel percussively, means within said elongated casing for suplying water through the hollow drill steel as the same is being driven by said hammer, means supplying pressurized air to said elongated chamber to effect the reciprocation of said piston hammer therein, and means for energizing said motor to rotate said drill steel chuck independently of said piston hammer, said last-named means including separately operable controls for said motor, said water supply means and said piston hammer positioned in close proximity to one another near the rear end of said casing.

17. In a rock drilling apparatus as defined in claim 16 wherein said rotary motor and drill steel chuck are removable as a unit from the forward end of said elongated casing.

References Cited in the file of this patent
UNITED STATES PATENTS

| | | |
|---|---|---|
| 1,575,987 | Gilman | Mar. 9, 1926 |
| 1,846,817 | Smith | Feb. 23, 1932 |
| 2,332,070 | Gillerstrom | Oct. 19, 1943 |

FOREIGN PATENTS

| | | |
|---|---|---|
| 244,714 | Great Britain | July 15, 1926 |
| 686,185 | Great Britain | Jan. 21, 1953 |